(12) United States Patent
Herbst et al.

(10) Patent No.: US 8,071,064 B2
(45) Date of Patent: Dec. 6, 2011

(54) XLI2MGHN HYDRIDES AS HYDROGEN STORAGE COMPOUNDS

(75) Inventors: Jan F. Herbst, Grosse Pointe Woods, MI (US); Martin S. Meyer, Southfield, MI (US); James R. Salvador, Lansing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 89 days.

(21) Appl. No.: 12/581,209

(22) Filed: Oct. 19, 2009

(65) Prior Publication Data

US 2011/0091368 A1  Apr. 21, 2011

(51) Int. Cl.
  *C01B 6/24* (2006.01)
  *C01F 17/00* (2006.01)
(52) U.S. Cl. ...... 423/263; 420/900; 423/644; 429/218.2
(58) Field of Classification Search .......... 423/644–647, 423/263; 420/900; 429/218.2
See application file for complete search history.

(56) References Cited

U.S. PATENT DOCUMENTS

| 7,618,607 | B2 * | 11/2009 | Herbst | 423/263 |
| 2008/0305024 | A1 | 12/2008 | Herbst | |
| 2011/0038776 | A1 * | 2/2011 | Herbst | 423/263 |

OTHER PUBLICATIONS

Takasaki et al. "High-pressure synthesis of novel hydrides Mg7-xAxTiH16-x (A=Li, Na, k x=0-1.0) and their reversible hydrogen storage properties" Journal of Alloys and compounds, 2010, 494, p. 439-445.*

* cited by examiner

*Primary Examiner* — Wayne Langel
*Assistant Examiner* — Syed Iqbal
(74) *Attorney, Agent, or Firm* — Reising Ethington P.C.

(57) ABSTRACT

State-of-the-art electronic structure calculations yield results consistent with the observed compound $SiLi_2Mg$ and provide likelihood of the availability of $IrLi_2Mg$ and $RhLi_2Mg$. Similar calculations provide likelihood of the availability of $YLi_2MgH_n$, $ZrLi_2MgH_n$, $NbLi_2MgH_n$, $MoLi_2MgH_n$, $TcLi_2MgH_n$, $RuLi_2MgH_n$, $RhLi_2MgH_n$, $LaLi_2MgH_n$, $Ce^{4+}Li_2MgH_n$, $Ce^{3+}Li_2MgH_n$, $PrLi_2MgH_n$, $NdLi_2MgH_n$, $PmLi_2MgH_n$, $SmLi_2MgH_n$, $EuLi_2MgH_n$, $GdLi_2MgH_n$, $TbLi_2MgH_n$, $DyLi_2MgH_n$, $HoLi_2MgH_n$, $ErLi_2MgH_n$, $TmLi_2MgH_n$, $YbLi_2MgH_n$, $LuLi_2MgH_n$, $HfLi_2MgH_n$, $TaLi_2MgH_n$, $ReLi_2MgH_n$, $OsLi_2MgH_n$, and $IrLi_2MgH_n$ (here n is an integer having a value in a particular compound of 4-7) as solid hydrides for the storage and release of hydrogen. Different hydrogen contents may be obtained in compounds having the same $XLi_2Mg$ crystal structures. These materials offer utility for hydrogen storage systems.

11 Claims, 2 Drawing Sheets

XLI2MGHN HYDRIDES AS HYDROGEN STORAGE COMPOUNDS

TECHNICAL FIELD

This invention pertains to compounds useful for solid-state storage of hydrogen. More specifically, this invention pertains to a family of new hydride compounds, $XLi_2MgH_n$, where X may be Y, Zr, Nb, Mo, Tc, Ru, Rh, La, Ce, Pr, Nd, Pm, Sm, Eu, Gd, Tb, Dy, Ho, Er, Tm, Yb, Lu, Hf, Ta, W, Re, Os, and Ir, and n is an integer having a value of 4-7. The invention also pertains to $RhLi_2Mg$ and $IrLi_2Mg$. These hydride compounds and two non-hydride analogs have utility for the storage of hydrogen.

BACKGROUND OF THE INVENTION

Considerable effort is currently being expended on the development of hydrogen and oxygen consuming fuel cells, and there is also interest in hydrogen burning engines. Such power systems require means for storage of hydrogen fuel which hold hydrogen in a safe form at ambient conditions and which are capable of quickly receiving and releasing hydrogen. In the case of automotive vehicles, fuel storage is required to be on-board the vehicle, and storage of hydrogen gas at high pressure is generally not preferred for such applications.

These requirements have led to the study and development of solid-state compounds for temporary storage of hydrogen, often as hydrides. For example, sodium alanate, $NaAlH_4$, can be heated to release hydrogen gas, and a mixture of lithium amide, $LiNH_2$, and lithium hydride, LiH, can be heated and reacted with the same effect. Despite such progress, however, no known solid-state system currently satisfies targets for on-board vehicular hydrogen storage.

SUMMARY OF THE INVENTION

This invention involves the use of state-of-the-art density functional theory to examine the possible formation of $XLi_2Mg$ materials and their hydrides with X being any of the elements Y, Zr, Nb, Mo, Tc, Ru, Rh, La, Ce, Pr, Nd, Pm, Sm, Eu, Gd, Tb, Dy, Ho, Er, Tm, Yb, Lu, Hf, Ta, W, Re, Os, and Ir (listed in order of increasing atomic number). These elements include certain 4d group elements, 5d group elements, and elements of the rare earth group. The results indicate that $XLi_2Mg$ compounds are thermodynamically stable with X=Rh and Ir and that previously unknown $XLi_2MgH_n$ hydrides may form for all elements X considered with the exception of W.

This discovery provides a basis for hydrogen storage systems. In the example of rhodium and iridium, the combination of a non-hydrogen-containing base compound and its hydride, its hydrogen-containing analog, provides a basis for a rechargeable storage system. And with each selection of X, hydrogen may be released from the $XLi_2Mg$ hydride to one or more compounds of the base elements into which hydrogen may again be stored. Hydrogen is released from the hydride by application of heat or the like.

Computational methods in chemistry, coupled with advances in affordable computing power, are now able to compute, with reasonable precision, the electronic total energies of elements and compounds. In turn, these electronic total energies may be combined to derive the enthalpy of formation of compounds from their constituent elements. Hence the feasibility of forming previously-unknown compounds, such as those with potential for controlled uptake and release of hydrogen, may be investigated computationally.

The Vienna ab initio simulation package (VASP), a state-of-the-art method implementing density functional theory, was employed with projector-augmented wave potentials constructed using the generalized gradient approximation for the exchange-correlation energy functional. Given a crystal structure, VASP computes the electronic structure, including the total electronic energy $E_{el}$.

Three template structures, $\mathcal{P}1$, $\mathcal{P}2$ and $\mathcal{P}3$ ($\mathcal{P}$ designating parent) were selected for the $XLi_2Mg$ compounds. $\mathcal{P}1$ is described by the $CuHg_2Ti$-type structure (fcc $F\bar{4}3m$ space group No. 216) with X, Li, and Mg atoms occupying the 4a, (4b, 4c), and 4d sites, respectively. $\mathcal{P}2$ is the $BiF_3$-type structure (fcc $Fm\bar{3}m$; No. 225) structure with X, Li, and Mg atoms on 4b, 8c, and 4a sites, respectively, and $\mathcal{P}3$ is described by the primitive cubic space group $P\bar{4}3m$ (No. 215) with X, Li, and Mg atoms occupying 4e, (1b, 3c, 4e), and (1a, 3d) sites, respectively.

Eight $XLi_2MgH_n$ templates $\mathcal{H}i$ ($\mathcal{H}$ designating hydride) were constructed from two known hydride structures. Seven of these were derived from the disordered tetragonal (P4/mmm; No. 123) $PdSr_2LiH_5$ structure. Enthalpies of formation ΔH were obtained for each template structure from differences of electronic total energies:

$$\Delta H(XLi_2Mg) = E_{el}(XLi_2Mg) - E_{el}(X) - 2E_{el}(Li) - E_{el}(Mg) \quad (1)$$

for the parent compounds, and $$\Delta H(XLi_2MgH_n) = (2/n)[E_{el}(XLi_2MgH_n) - E_{el}(X) - 2E_{el}(Li) - E_{el}(Mg) - (n/2)E_{el}(H_2)] \quad (2)$$

for the hydrides, where n is the number of H atoms in a given configuration. Each ΔH, specified per $XLi_2Mg$ formula unit (f. u.) in Eq. (1) and per $H_2$ molecule in Eq. (2), is the standard enthalpy of formation at zero temperature in the absence of zero point energy contributions. A negative ΔH indicates stability of the material relative to its elemental metal and molecular $H_2$ constituents.

Thus, a group of new hydrides are provided as compounds capable of releasing hydrogen for a hydrogen-consuming device. These new compounds are $XLi_2MgH_n$, where X will typically be any one of the elements Y, Zr, Nb, Mo, Tc, Ru, Rh, La, Ce, Pr, Nd, Pm, Sm, Eu, Gd, Tb, Dy, Ho, Er, Tm, Yb, Lu, Hf, Ta, Re, Os, and Ir, and n is an integer having a value of 4-7. Moreover, two new non-hydride compounds, $RhLi_2Mg$ and $IrLi_2Mg$ have been predicted by the calculations.

In addition to demonstrating the credible likelihood of the formation of the above identified hydrides and non-hydrides by calculations, $IrLi_2Mg$ has been prepared and its crystal structure determined.

In preferred hydrogen storage systems, these new hydrides, typically stored as a body of particles, release their hydrogen upon heating to yield one or more solid de-hydrogenated compounds to which hydrogen may subsequently be restored. The original hydride may be restored by contacting the base compounds with hydrogen under suitable pressure and temperature conditions.

Other objects and advantages of the invention will be apparent from the following description of preferred embodiments.

DESCRIPTION OF PREFERRED EMBODIMENTS

State-of-the-art computational electronic structure methods implementing density functional theory (DFT) have been employed with substantial success to model hydride properties, including the crucial enthalpies of formation. That success encourages the development of strategies for harnessing these calculational tools to guide the discovery of novel hydrides. The approach in this case is to choose a related compound having a known crystal structure and calculate enthalpies of formation for isostructural, hypothetical compounds constructed by elemental replacement. In a further step, a parallel process is followed for a hypothetical hydride derived from the hypothetical compound through the addition of hydrogen to the original lattice.

The goal is to identify compounds which may take up and release hydrogen in a reversible manner. Thus in pursuing computational approaches using isostructural templates to guide the calculation, at least one template, for the compound itself, is required. This represents the simplest outcome and physically corresponds to a situation where the template structure of the compound is sufficiently open to accommodate hydrogen without distorting the structure. If this situation does not arise, then one template structure will be required for the compound and another for the hydride.

In practice of this invention it has been found that even this situation is inadequate to fully capture the complexities of the reaction. First, more than one compound template is desirable and these will be designated as $\mathcal{P}$1, $\mathcal{P}$2 and $\mathcal{P}$3 and then eight template structures, designated as $\mathcal{H}$1- $\mathcal{H}$8, are utilized for the hydride. Details are provided in subsequent sections but it should be emphasized that the structural choices are not arbitrary but are guided and informed by the known behavior of either representative examples of the family of compounds or by knowledge of analogous compounds.

For the compounds, XLi$_2$Mg, three template structures are considered, all cubic, with templates $\mathcal{P}$1 and $\mathcal{P}$2 being face-centered cubic and $\mathcal{P}$3 being a primitive cubic. The choice of $\mathcal{P}$1 and $\mathcal{P}$2 is based on crystallographic information available for known XLi$_2$Mg ternary compounds. Many of these structures are disordered but ordered compounds form in a limited number of cases. The disordered structures possess 4 Li and 4 Mg, or 4 X and 4 Mg atoms on an 8-fold site in the conventional cell of either the BiF$_3$-type (Fm$\bar{3}$m; No. 225) or NaTl-type (Fd$\bar{3}$m; No. 227) space group. To circumvent the necessity of constructing large supercells which would significantly increase the computational demand, these structures were analyzed using four ordered analogous structures. These were constructed by enforcing the placement of either one Li and one Mg atom, or of one X and one Mg atom, on either of the two sites in the primitive cell.

Figure 1:
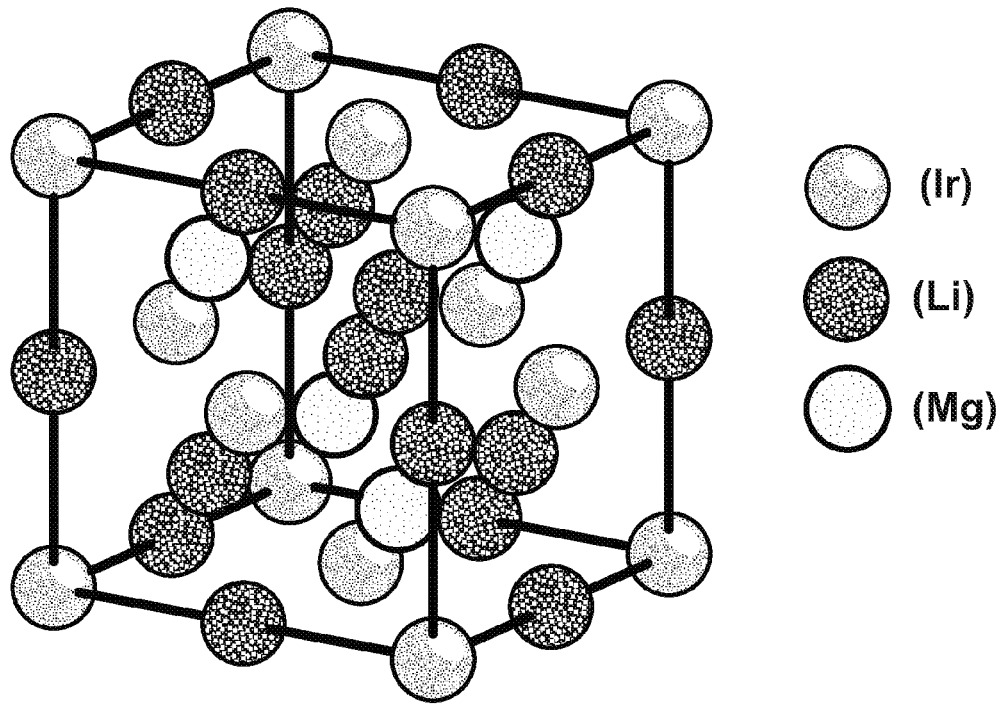
FIG. 1 shows proposed compound, $IrLi_2Mg$, in the face-centered cubic $F\bar{4}3m$ structure corresponding to the $\mathcal{P}1$ template.

These four ordered structures can all be described by the fcc F$\bar{4}$3m space group (No. 216) with X, Li, and Mg atoms occupying the 4a, (4b, 4c), and 4d sites, respectively. This was chosen as template $\mathcal{P}$1 whose structure is shown in FIG. 1, for the proposed compound IrLi$_2$Mg.

Another representative ordered structure represented is the BiF$_3$-type (Fm$\bar{3}$m; No. 225) with X, Li, and Mg atoms on 4b, 8c, and 4a sites, respectively. This structure was selected as the second parent template, $\mathcal{P}$2, for the proposed compound IrLi$_2$Mg.

Figure 2:
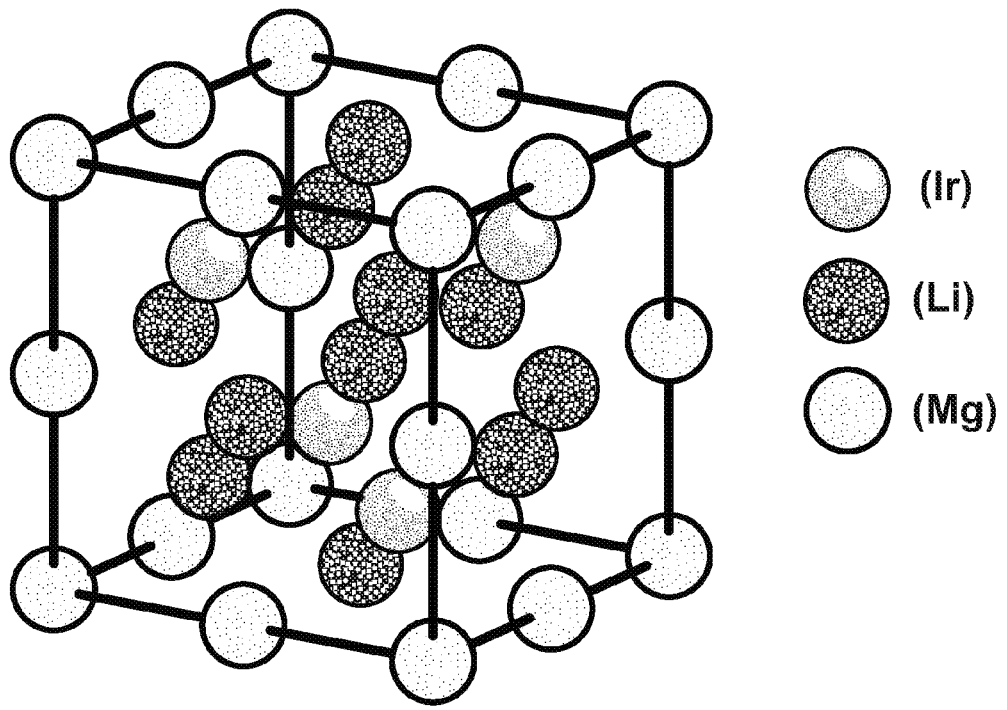
FIG. 2 shows proposed compound, IrLi$_2$Mg, in the primitive cubic P$\bar{4}$3m structure corresponding to the $\mathcal{P}$3 template.

To further explore the implications of the choice of the template structure, but mindful of the cubic symmetry of templates $\mathcal{P}$1 and $\mathcal{P}$2 a third cubic structure P$\bar{4}$3m (No. 215) was chosen as template $\mathcal{P}$3. This structure, having X, Li, and Mg atoms on 4e, (1b, 3c, 4e), and (1a, 3d) sites, respectively, has been established experimentally here for IrLi$_2$Mg; it has also been determined recently as the correct structure for SiLi$_2$Mg. This structure was selected for the third parent template, $\mathcal{P}$3, and is shown in FIG. 2.

There are multiple available sites in the $\mathcal{P}$1 template structure for incorporation of hydrogen atoms. To identify a structural template for the hydride, preliminary computations were performed to assess the stability of hydrides based on the structure of AgLi$_2$Mg. Various numbers of hydrogen atoms were inserted at various locations in the $\mathcal{P}$1 lattice and the stability of the resulting hydrides AgLi$_2$MgH$_n$ evaluated. The results indicated that stable hydrides would not form and thus that this structure is not a suitable template for the hydride.

Consideration was then given to structures of lower symmetry. Eight XLi$_2$MgH$_n$ templates $\mathcal{H}$i ( $\mathcal{H}$ designating hydride) were constructed from two known hydride structures having lower lattice symmetries. Seven of these were derived from the disordered tetragonal (P4/mmm; No. 123) PdSr$_2$LiH$_5$ structure and satisfied the cases when n, the number of hydrogen atoms, was 4, 5 or 6. For the case where the case of 7 hydrogen atoms the template structure was derived from the ordered hexagonal (P6$_3$/mmc; No. 194) RuMg$_2$LiH$_7$ structure.

To progress from the known PdSr$_2$LiH$_5$ to the desired XLi$_2$MgH$_n$ structure the following atom substitutions are first made to transform the parent PdSr$_2$Li atom placement into an atom placement for the desired parent XLi$_2$Mg. X is substituted for Pd; Li is substituted for Sr; and Mg is substituted for Li. This locates X, Li, and Mg on the 1a, 2h, and 1b sites in P4/mmm, respectively. To progress from the known RuMg$_2$Li atom placement to the desired XLi$_2$Mg atom placement, X is substituted for Ru; Mg is substituted for Li; and Li is substituted for Mg.

In the hydride PdSr$_2$LiH$_5$ the H atoms occupy the 2e, 2g, and one of the 2f sites. Seven XLi$_2$MgH$_n$ templates with n=4, 5, and 6 were generated by various fillings of these, with the eighth template based on RuMg$_2$LiH$_7$. The templates are:

$\mathcal{H}$1-XLi$_2$MgH$_4$ with four H atoms on the 2e and 2f sites. The P4/mmm space group symmetry (of PdSr$_2$LiH$_5$) is preserved.

$\mathcal{H}$2-XLi$_2$MgH$_4$ with four H atoms on the 2e and 2g sites. The P4/mmm space group symmetry (of PdSr$_2$LiH$_5$) is maintained.

$\mathcal{H}$3-XLi$_2$MgH$_4$ with four H atoms on the 2f and 2g sites. The structure remains P4/mmm.

$\mathcal{H}$4-XLi$_2$MgH$_5$ with five H atoms occupying one of the 2e and all 2f, 2g sites. This structure is equivalent to an ordered orthorhombic Pmmm (No. 47) lattice with X (1a), Li (2l), Mg (1b), and H (1c, 1e, 1f, and 2i) sites.

$\mathcal{H}$5-XLi$_2$MgH$_5$ with five H atoms occupying one of the 2f and all 2e, 2g sites. This structure can also be described as ordered orthorhombic Pmmm with X (1a), Li (2l), Mg (1b), and H (1c, 1d, 1f, and 2i) sites.

$\mathcal{H}$6-XLi$_2$MgH$_5$ with five H atoms occupying one of the 2g and all 2e, 2f sites. This structure is equivalent to an ordered tetragonal P4m (No. 99) structure with X (1a$_1$), Li (1b$_1$, 1b$_2$), Mg (1a$_2$), and H (1a$_3$, 2c$_1$, and 2c$_2$) sites.

$\mathcal{H}7$-XLi$_2$MgH$_6$ with six H atoms on the 2e, 2f, and 2g sites. The space group symmetry is again P4/mmm.

Figure 3:
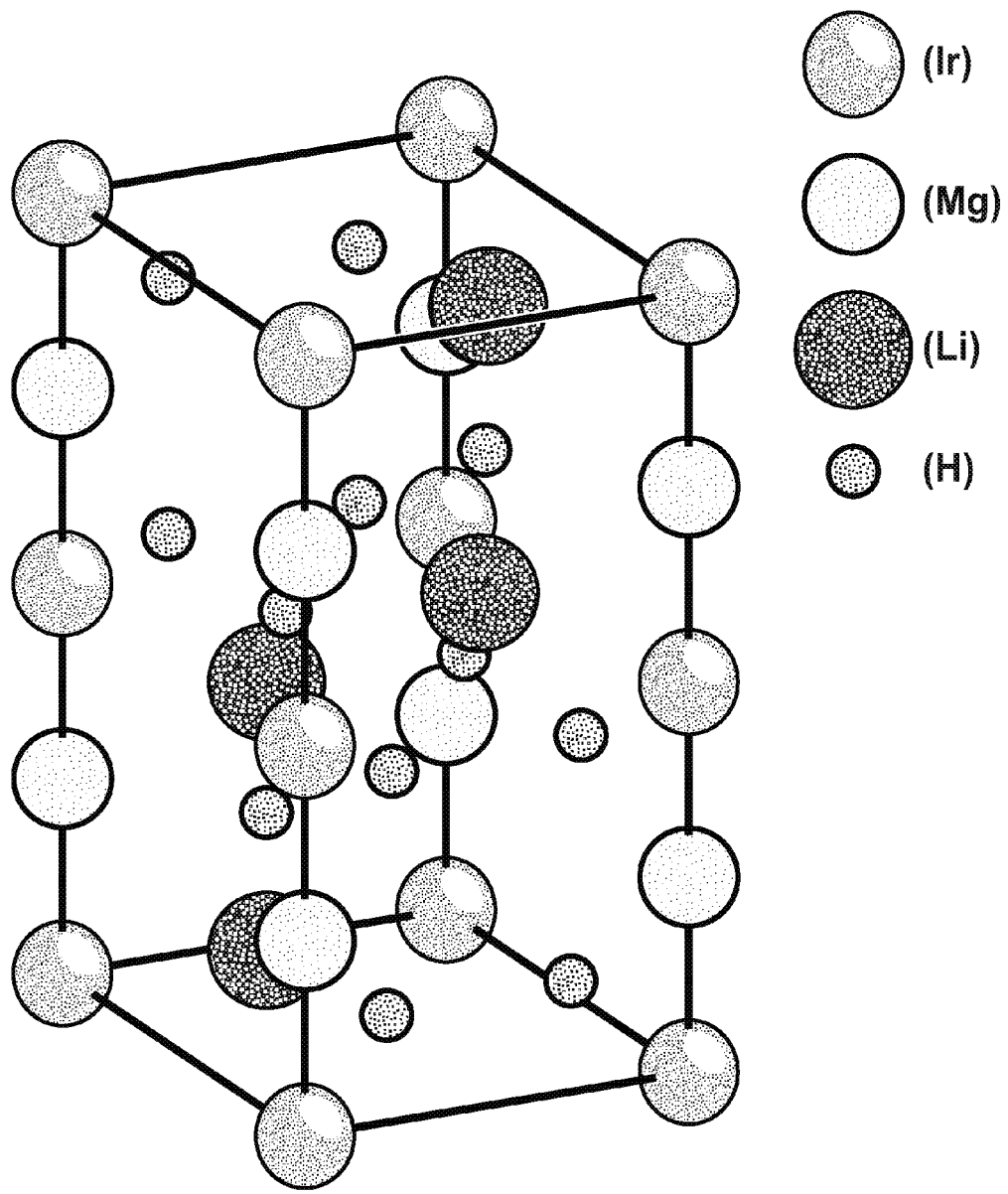
FIG. 3 shows the proposed IrLi$_2$MgH$_7$ compound in the hexagonal P6$_3$/mmc structure corresponding to the $\mathcal{H}$8 template.

$\mathcal{H}8$-XLi$_2$MgH$_7$ ordered hexagonal (P6$_3$/mmc; No. 194). The populated sites are X (2a), Li (4f), Mg (2b), and H (2c, 12k). This is the structure shown in FIG. 3 for the proposed compound IrLi$_2$MgH$_7$.

Since the purpose of the calculations is to identify previously unknown compounds and hydrides, there can be no foreknowledge of which compounds or hydrides are stable, and if stable, what structure they will adopt. Hence calculations must be made for various parent and hydride structures.

As detailed at some length above the choice of templates is informed by the behavior of compounds comprising elemental species believed to behave in comparable manner to those under consideration. However, it is well known to those skilled in the art that apparently minor differences in valence or atomic size between chemical species will promote their adoption of different crystal structures. Thus, there can be no guarantee that the structural choices described comprise all possible crystal structures that might be adopted by the chemical compounds under consideration.

However, in the absence of any kinetic barrier, compounds will adopt their lowest energy configuration. Thus, any compound identified as stable under the artificial constraint that it adopts the crystal structure of one of the designated templates must be stable if it crystallizes in another structure since the occurrence of another structure, by definition, means that it has the lowest energy. Stated differently, the calculations provide an upper bound on the energies of the proposed compounds and, as such, lead to reliable predictions of stability even if they cannot be used as predictors of crystal structure.

Electronic total energies $E_{el}$ were calculated with the Vienna ab initio simulation package (VASP), which implements DFT using a plane wave basis set. Projector-augmented wave potentials were employed for the elemental constituents, and the generalized gradient approximation (GGA) of Perdew and Wang was used for the exchange-correlation energy functional $\mu_{xc}$. Results for X=Ce were computed for both Ce$^{3+}$ (one 4f electron in the fixed core) and Ce$^{4+}$. Although Sm, Eu, Tm and Yb often exhibit two valence states with different 4f occupancy as well, the calculations reported here were done for Sm$^{3+}$, Eu$^{2+}$, Tm$^{3+}$ and Yb$^{2+}$ since PAW (Projector Augmented Wave) potentials were only available for those most common configurations. Non-magnetic calculations were performed for all materials. In all cases a 900 eV plane wave cutoff energy was imposed. The number of points in the irreducible Brillouin zone for the k-space meshes utilized was at least 120 ($\mathcal{P}1$), 165 ($\mathcal{P}2$), 220 ($\mathcal{P}3$), 125 ($\mathcal{H}4$, $\mathcal{H}5$) 126 ($\mathcal{H}1$, $\mathcal{H}2$, $\mathcal{H}3$, $\mathcal{H}6$, $\mathcal{H}7$), and 133 ($\mathcal{H}8$). At least two simultaneous relaxations of the lattice constants and nuclear coordinates not fixed by the space group were carried out. The electronic total energies and forces were converged to 10$^{-6}$ eV/cell and 10$^{-3}$ eV/Å, respectively. Calculations for the H$_2$ molecule and the elemental metals were performed with the same computational machinery to the same levels of precision.

Enthalpies of formation $\Delta H$ were obtained from differences of electronic total energies:

$$\Delta H(XLi_2Mg) = E_{el}(XLi_2Mg) - E_{el}(X) - 2E_{el}(Li) - E_{el}(Mg)$$

for the parent compounds, and $$\Delta H(XLi_2MgH_n) = (2/n)[E_{el}(XLi_2MgH_n) - E_{el}(X) - 2E_{el}(Li) - E_{el}(Mg) - (n/2)E_{el}(H_2)]$$

for the hydrides, where $E_{el}(Y)$ is the electronic total energy of constituent Y and n is the number of H atoms in a given configuration. Each $\Delta H$, specified per XLi$_2$Mg formula unit (f. u.) in Eq. (1) and per H$_2$ molecule in Eq. (2), is the standard enthalpy of formation at zero temperature in the absence of zero point energy contributions.

TABLE I

| Compound | $\Delta H$ (XLi2Mg) (kJ/mole f. u.) | | |
|---|---|---|---|
| | $\mathcal{P}1$ | $\mathcal{P}2$ | $\mathcal{P}3$ |
| SiLi$_2$Mg | −98 | −74 | −101 |
| YLi$_2$Mg | 41 | 18 | 39 |
| ZrLi$_2$Mg | 111 | 86 | 110 |
| NbLi$_2$Mg | 212 | 192 | 208 |
| MoLi$_2$Mg | 258 | 250 | 255 |
| TcLi$_2$Mg | 189 | 194 | 188 |
| RuLi$_2$Mg | 67 | 85 | 65 |
| RhLi$_2$Mg | −103 | −73 | −104 |
| LaLi$_2$Mg | 30 | 11 | 28 |
| Ce$^{4+}$Li$_2$Mg | 93 | 72 | 93 |
| Ce$^{3+}$Li$_2$Mg | 24 | 5 | 23 |
| PrLi$_2$Mg | 28 | 9 | 27 |
| NdLi$_2$Mg | 31 | 12 | 30 |
| PmLi$_2$Mg | 35 | 15 | 33 |
| SmLi$_2$Mg | 38 | 17 | 36 |
| EuLi$_2$Mg | 19 | 4 | 19 |
| GdLi$_2$Mg | 43 | 21 | 41 |
| TbLi$_2$Mg | 46 | 24 | 44 |
| DyLi$_2$Mg | 49 | 27 | 47 |
| HoLi$_2$Mg | 52 | 30 | 50 |
| ErLi$_2$Mg | 55 | 32 | 52 |
| TmLi$_2$Mg | 57 | 33 | 54 |
| YbLi$_2$Mg | 22 | 3 | 21 |
| LuLi$_2$Mg | 61 | 37 | 58 |
| HfLi$_2$Mg | 152 | 124 | 148 |
| TaLi$_2$Mg | 263 | 239 | 255 |
| WLi$_2$Mg | 337 | 323 | 330 |
| ReLi$_2$Mg | 271 | 270 | 267 |
| OsLi$_2$Mg | 143 | 158 | 140 |
| IrLi$_2$Mg | −76 | −50 | −79 |

A negative $\Delta H$ indicates stability of the material relative to its elemental metal and molecular H$_2$ constituents. Table I lists $\Delta H(XLi_2Mg)$ calculated according to Eq. (1) for all XLi$_2$Mg compounds with X=Y, Zr, Nb, Mo, Tc, Ru, Rh, La, Ce, Pr, Nd, Pm, Sm, Eu, Gd, Tb, Dy, Ho, Er, Tm, Yb, Lu, Hf, Ta, W, Re, Os, and Ir with structures based on the $\mathcal{P}1$, $\mathcal{P}2$ and $\mathcal{P}3$ templates. For purposes of validation, a similar calculation was performed for SiLi$_2$Mg. In qualitative agreement with experimental evidence for its existence, $\Delta H$ is negative for SiLi$_2$Mg (shown in underlined bold in Table I) using all three templates. For the group of compounds not previously reported, $\Delta H$ is positive for XLi$_2$Mg with X=Y, Zr, Nb, Mo, Tc, Ru, La, Ce, Pr, Nd, Pm, Sm, Eu, Gd, Tb, Dy, Ho, Er, Tm, Yb, Lu, Hf, Ta, W, Re and Os indicating that the compounds likely do not exist. Of the remainder, Ce$^{3+}$Li$_2$Mg, EuLi$_2$Mg and YbLi$_2$Mg show only small positive $\Delta H$ values for structures corresponding to the $\mathcal{P}2$ template leaving open to question whether or not they might be marginally stable in view of the upper bound nature of the calculations. The other three compounds, shown in bold underline, SiLi$_2$Mg, RhLi$_2$Mg and IrLi$_2$Mg, show large negative $\Delta H$ values for all three templates and are therefore predicted to be stable. As noted, SiLi$_2$Mg is known to exist but RhLi$_2$Mg and IrLi$_2$Mg, are previously-unreported compounds. In all cases the $\mathcal{P}1$ and $\mathcal{P}3$ templates yield nearly identical and appreciably lower values of $\Delta H$ than the $\mathcal{P}2$ template, suggesting that the $\mathcal{P}2$ structure would not be observed. This is again consistent with the known properties of SiLi$_2$Mg which adopts the crystal structure of the $\mathcal{P}3$ template. Thus, the credible likelihood of the formability of a pair of novel three element compounds comprising Li and Mg is established: RhLi$_2$Mg and IrLi$_2$Mg.

Turning now to the hydrides, enthalpies of formation relative to the elemental metals and $H_2$ for the $XLi_2MgH_n$ hydrides in the eight $\mathcal{H}i$ template structures are presented in Table II. At least one, and in most cases several, negative $\Delta H$ values are obtained for every X except W, raising the possibility of hydride formation in the cases of Y, Zr, Nb, Mo, Tc, Ru, Rh, La, Ce (in both the +4 and +3 oxidation states), Pr, Nd, Pm, Sm, Eu, Gd, Tb, Dy, Ho, Er, Tm, Yb, Lu, Hf, Ta, Re, Os, and Ir. For each X the lowest $\Delta H$ value is shown in bold underline and Table III summarizes the minimum $\Delta H$ results from Table II and includes the hydrogen mass percentage for each hydride.

TABLE II $\Delta H(XLi_2MgH_n)$ (kJ/mole $H_2$)

| X | $\mathcal{H}1$ (4) | $\mathcal{H}2$ (4) | $\mathcal{H}3$ (4) | $\mathcal{H}4$ (5) | $\mathcal{H}5$ (5) | $\mathcal{H}6$ (5) | $\mathcal{H}7$ (6) | $\mathcal{H}8$ (7) |
|---|---|---|---|---|---|---|---|---|
| Y | −7 | −43 | −25 | −33 | −35 | −89 | −51 | 4 |
| Zr | 8 | −11 | −19 | −27 | −28 | −57 | −45 | 5 |
| Nb | 41 | 35 | 5 | −5 | −1 | −15 | −22 | 21 |
| Mo | 52 | 69 | 12 | 3 | 23 | 4 | −10 | 30 |
| Tc | 18 | 61 | −25 | −25 | 8 | −20 | −29 | −3 |
| Ru | −33 | 29 | −73 | −59 | −24 | −47 | −60 | −49 |
| Rh | −96 | −46 | −112 | −85 | −77 | −85 | −90 | −102 |
| La | 25 | −46 | 10 | −2 | −26 | −77 | −20 | 20 |
| Ce$^{4+}$ | 40 | −25 | 20 | 7 | −15 | −80 | −13 | 13 |
| Ce$^{3+}$ | 29 | −45 | 17 | 4 | −23 | −77 | −16 | 26 |
| Pr | 23 | −44 | 11 | −1 | −25 | −79 | −21 | 24 |
| Nd | 18 | −43 | 6 | −6 | −26 | −80 | −26 | 22 |
| Pm | 13 | −43 | 0 | −12 | −27 | −82 | −31 | 20 |
| Sm | 10 | −42 | −4 | −15 | −28 | −83 | −34 | 18 |
| Eu | 25 | −43 | 8 | −6 | −20 | −70 | −24 | 44 |
| Gd | 1 | −42 | −15 | −24 | −30 | −86 | −42 | 13 |
| Tb | −1 | −41 | −18 | −27 | −30 | −86 | −45 | 11 |
| Dy | −3 | −40 | −21 | −30 | −31 | −86 | −48 | 9 |
| Ho | −4 | −39 | −24 | −32 | −31 | −86 | −50 | 7 |
| Er | −5 | −38 | −26 | −34 | −32 | −89 | −51 | 5 |
| Tm | −6 | −37 | −28 | −36 | −32 | −89 | −53 | 3 |
| Yb | 8 | −43 | −11 | −23 | −21 | −72 | −41 | 44 |
| Lu | −7 | −34 | −32 | −38 | −33 | −88 | −55 | 0 |
| Hf | 20 | 4 | −17 | −23 | −22 | −45 | −43 | 4 |
| Ta | 59 | 47 | 15 | 7 | 8 | −7 | −16 | 22 |
| W | 87 | 90 | 41 | 30 | 42 | 27 | 7 | 33 |
| Re | 57 | 87 | 10 | 5 | 30 | 11 | −9 | 0 |
| Os | 10 | 60 | −37 | −29 | 1 | −16 | −40 | −48 |
| Ir | −74 | −28 | −96 | −73 | −66 | −62 | −84 | −116 |

TABLE III

| $XLi_2MgH_n$ hydride ($\mathcal{H}i$) | $\Delta H(XLi_2MgH_n)$ (kJ/mole $H_2$) | $\Delta H^*(XLi_2MgH_n)$ (kJ/mole $H_2$) | mass % H |
|---|---|---|---|
| $YLi_2MgH_5$ ($\mathcal{H}6$) | −89 | — | 3.8 |
| $ZrLi_2MgH_5$ ($\mathcal{H}6$) | −57 | — | 3.7 |
| $NbLi_2MgH_6$ ($\mathcal{H}7$) | −22 | — | 4.4 |
| $MoLi_2MgH_6$ ($\mathcal{H}7$) | −10 | — | 4.3 |
| $TcLi_2MgH_6$ ($\mathcal{H}7$) | −29 | — | 4.3 |
| $RuLi_2MgH_4$ ($\mathcal{H}3$) | −73 | — | 2.8 |
| $RhLi_2MgH_4$ ($\mathcal{H}3$) | −112 | −61 | 2.8 |
| $RhLi_2MgH_7$ ($\mathcal{H}8$) | −102 | −73 | 4.8 |
| $LaLi_2MgH_5$ ($\mathcal{H}6$) | −77 | — | 2.8 |
| $Ce^{4+}Li_2MgH_5$ ($\mathcal{H}6$) | −80 | — | 2.7 |
| $Ce^{3+}Li_2MgH_5$ ($\mathcal{H}6$) | −77 | — | 2.7 |
| $PrLi_2MgH_5$ ($\mathcal{H}6$) | −79 | — | 2.7 |
| $NdLi_2MgH_5$ ($\mathcal{H}6$) | −80 | — | 2.7 |
| $PmLi_2MgH_5$ ($\mathcal{H}6$) | −82 | — | 2.6 |
| $SmLi_2MgH_5$ ($\mathcal{H}6$) | −83 | — | 2.6 |
| $EuLi_2MgH_5$ ($\mathcal{H}6$) | −70 | — | 2.6 |
| $GdLi_2MgH_5$ ($\mathcal{H}6$) | −86 | — | 2.5 |
| $TbLi_2MgH_5$ ($\mathcal{H}6$) | −86 | — | 2.5 |
| $DyLi_2MgH_5$ ($\mathcal{H}6$) | −86 | — | 2.4 |
| $HoLi_2MgH_5$ ($\mathcal{H}6$) | −86 | — | 2.4 |
| $ErLi_2MgH_5$ ($\mathcal{H}6$) | −89 | — | 2.4 |
| $TmLi_2MgH_5$ ($\mathcal{H}6$) | −89 | — | 2.4 |
| $YbLi_2MgH_5$ ($\mathcal{H}6$) | −72 | — | 2.3 |
| $LuLi_2MgH_5$ ($\mathcal{H}6$) | −88 | — | 2.3 |
| $HfLi_2MgH_5$ ($\mathcal{H}6$) | −88 | — | 2.3 |
| $TaLi_2MgH_6$ ($\mathcal{H}7$) | −16 | — | 2.7 |
| $ReLi_2MgH_6$ ($\mathcal{H}7$) | −9 | — | 2.6 |
| $OsLi_2MgH_7$ ($\mathcal{H}8$) | −48 | — | 3.0 |
| $IrLi_2MgH_7$ ($\mathcal{H}8$) | −116 | −94 | 3.0 |

According to the van't Hoff relation $$\ln p/p_0 = \Delta H/RT - \Delta S/R,$$

where $\Delta S$ is the entropy of formation and R the gas constant, the configuration having the most negative $\Delta H$ is that which is stable at the lowest $H_2$ pressure p.

For controlled and repeated hydrogen uptake and release, it is more desirable to have $XLi_2MgH_n$ release hydrogen while reverting to $XLi_2Mg$ than to have $XLi_2MgH_n$ revert to its constituent elements while releasing hydrogen. The preferred reversible reaction is then:

$$XLi_2MgH_n \leftrightarrow XLi_2Mg + n/2 H_2,$$

and the formation enthalpy of the hydride with respect to its parent compound, $\Delta H^*(XLi_2MgH_n)$, is given by:

$$\Delta H^*(XLi_2MgH_n) = (2/n)[E_{el}(XLi_2MgH_n) - E_{el}(XLi_2Mg) - (n/2)E_{el}(H_2)]$$

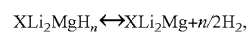

Listings of ΔH*($XLi_2MgH_n$) are also given in Table III.

For the predicted hydrides $RhLi_2MgH_4$ ($\mathcal{H}3$ template), $RhLi_2MgH_7$ ($\mathcal{H}8$ template) and $IrLi_2MgH_7$ ($\mathcal{H}8$ template), ΔH*($XLi_2MgH_n$)<0 in Table III and a stable parent ($RhLi_2Mg$, $IrLi_2Mg$) is predicted to exist (cf. Table I) suggesting the desirable possibility of cycling between the two according to the reaction given above.

Thus, a family of hydrides is provided as follows: $YLi_2MgH_n$, $ZrLi_2MgH_n$, $NbLi_2MgH_n$, $MoLi_2MgH_n$, $TcLi_2MgH_n$, $RuLi_2MgH_n$, $RhLi_2MgH_n$, $LaLi_2MgH_n$, $Ce^{4+}Li_2MgH_n$, $Ce^{3+}Li_2MgH_n$, $PrLi_2MgH_n$, $NdLi_2MgH_n$, $PmLi_2MgH_n$, $SmLi_2MgH_n$, $EuLi_2MgH_n$, $GdLi_2MgH_n$, $TbLi_2MgH_n$, $DyLi_2MgH_n$, $HoLi_2MgH_n$, $ErLi_2MgH_n$, $TmLi_2MgH_n$, $YbLi_2MgH_n$, $LuLi_2MgH_n$, $HfLi_2MgH_n$, $TaLi_2MgH_n$, $ReLi_2MgH_n$, $OsLi_2MgH_n$ and $IrLi_2MgH_n$. In these hydride formulas, n is an integer having a value from 4 to 7.

Particles of one or more of these compositions may be used in a suitable, predetermined mass to release a desired quantity of hydrogen upon heating for delivery to a hydrogen-consuming device. Upon release of hydrogen they may revert to like hydrogen-depleted analogs or other useful hydrogen-storage compounds containing the base elements. Hydrogen may be reacted with the analogs or remaining compounds to restore the hydrides for re-use.

EXPERIMENTAL

Guided by the calculations, it was decided to attempt a synthesis of $IrLi_2Mg$. Equimolar quantities of iridium and magnesium in powder form (~325 mesh) were well mixed and added to a stoichiometric quantity of lithium. The three-component mixture was placed in a stainless steel crucible and sealed under an inert atmosphere of argon with a stainless steel closure by arc welding. This practice was followed to avoid oxidation, particularly of lithium, and to avoid loss by vaporization. The crucible was then held at a temperature of 510° C. for 4 days. Following such enclosed heating, the crucible was opened, the contents were fragmented and the resulting powder subjected to conventional powder X-ray diffraction analysis. The X-ray diffraction data confirmed that the reaction product was crystalline and present as a single phase in a cubic structure. The data was also consistent with the presence of only a single compound and showed no discernable peaks corresponding to the elemental constituents. This analysis was taken as strongly suggesting the formation of the predicted $IrLi_2Mg$ compound. Further validation was afforded by high energy ball milling the constituents in a stainless steel milling jar under an inert argon atmosphere. This process afforded similar results but indicated the presence of some impurities, mainly un-reacted iridium.

Samples of the prepared material, considered to be $IrLi_2Mg$, were placed in a Cahn TG-2151 high-pressure, thermogravimetric analyzer, pressurized to 82 bar of hydrogen, heated to 400° C., and held at temperature for approximately nine hours. The temperature of the contents of the analyzer was then reduced to about 25° C. It was expected that the material had adsorbed some hydrogen. The hydrogen gas atmosphere was carefully released from the analyzer and replaced with helium to a pressure of 1.3 bar. The powder in the analyzer under a helium atmosphere was then progressively heated to 450° C. and held at temperature for about an hour during which time the sample weight stabilized. A mass spectrometer analysis of the gas atmosphere confirmed the evolution of hydrogen gas substantiating that $IrLi_2Mg$ was likely hydrogenated in accord with expectations based on the calculated enthalpies.

The invention claimed is:

1. Any one or more of the hydrides having a compositional formula selected from the group consisting of $YLi_2MgH_n$, $ZrLi_2MgH_n$, $NbLi_2MgH_n$, $MoLi_2MgH_n$, $TcLi_2MgH_n$, $RuLi_2MgH_n$, $RhLi_2MgH_n$, $LaLi_2MgH_n$, $Ce^{4+}Li_2MgH_n$, $Ce^{3+}Li_2MgH_n$, $PrLi_2MgH_n$, $NdLi_2MgH_n$, $PmLi_2MgH_n$, $SmLi_2MgH_n$, $EuLi_2MgH_n$, $GdLi_2MgH_n$, $TbLi_2MgH_n$, $DyLi_2MgH_n$, $HoLi_2MgH_n$, $ErLi_2MgH_n$, $TmLi_2MgH_n$, $YbLi_2MgH_n$, $LuLi_2MgH_n$, $HfLi_2MgH_n$, $TaLi_2MgH_n$, $ReLi_2MgH_n$, $OsLi_2MgH_n$, $IrLi_2MgH_n$ where n is an integer having a value of 4 to 7.

2. One or more of the hydrides of claim 1 having a compositional formula selected from the group consisting of $YLi_2MgH_n$ and $ZrLi_2MgH_n$.

3. One or more of the hydrides of claim 1 having a compositional formula selected from the group consisting of $NbLi_2MgH_n$, $MoLi_2MgH_n$, and $TcLi_2MgHn$.

4. One or more of the hydrides of claim 1 having a compositional formula selected from the group consisting of $RuLi_2MgH_n$, $RhLi_2MgH_n$, and $LaLi_2MgHn$.

5. One or more of the hydrides of claim 1 having a compositional formula selected from the group consisting of $Ce^{4+}Li_2MgH_n$, $Ce^{3+}Li_2MgH_n$, and $PrLi_2MgH_n$.

6. One or more of the hydrides of claim 1 having a compositional formula selected from the group consisting of $NdLi_2MgH_n$, $PmLi_2MgH_n$, and $SmLi_2MgH_n$.

7. One or more of the hydrides of claim 1 having a compositional formula selected from the group consisting of $EuLi_2MgH_n$, $GdLi_2MgH_n$, and $TbLi_2MgH_n$.

8. One or more of the hydrides of claim 1 having a compositional formula selected from the group consisting of $DyLi_2MgH_n$, $HoLi_2MgH_n$, and $ErLi_2MgH_n$.

9. One or more of the hydrides of claim 1 having a compositional formula selected from the group consisting of $TmLi_2MgH_n$, $YbLi_2MgH_n$, $LuLi_2MgH_n$, and $HfLi_2MgH_n$.

10. One or more of the hydrides of claim 1 having a compositional formula selected from the group consisting of $TaLi_2MgH_n$, $ReLi_2MgH_n$, $OsLi_2MgH_n$, and $IrLi_2MgH_n$.

11. One or more of the chemical compounds having a chemical formula selected from the group consisting of $IrLi_2Mg$ and $RhLi_2Mg$.

* * * * *